(12) United States Patent
Dizaji et al.

(10) Patent No.: US 6,717,545 B2
(45) Date of Patent: Apr. 6, 2004

(54) ADAPTIVE SYSTEM AND METHOD FOR RADAR DETECTION

(75) Inventors: Reza Dizaji, Waterloo (CA); Tony Ponsford, Waterloo (CA)

(73) Assignee: Raytheon Canada Limited, Waterloo (CA)

( * ) Notice: Subject to any disclaimer, the term of this patent is extended or adjusted under 35 U.S.C. 154(b) by 0 days.

(21) Appl. No.: 10/384,093

(22) Filed: Mar. 7, 2003

(65) Prior Publication Data

US 2003/0174088 A1 Sep. 18, 2003

Related U.S. Application Data

(60) Provisional application No. 60/363,569, filed on Mar. 13, 2002, and provisional application No. 60/365,191, filed on Mar. 19, 2002.

(51) Int. Cl.⁷ .............................. G01S 7/34; G01S 13/00
(52) U.S. Cl. .............................. 342/93; 342/89; 342/91; 342/159; 342/175; 342/195
(58) Field of Search ............................. 342/27, 28, 89, 342/90–103, 159, 175, 192–197, 118, 127, 128–147, 149–158, 160–164

(56) References Cited

U.S. PATENT DOCUMENTS

| | | | | | |
|---|---|---|---|---|---|
| 3,761,922 A | * | 9/1973 | Evans | .......................... | 342/93 |
| 4,031,364 A | | 6/1977 | Wilmot | | |
| 4,079,376 A | * | 3/1978 | Kirk, Jr. | ....................... | 342/93 |
| 4,089,002 A | * | 5/1978 | Kerr et al. | ...................... | 342/93 |
| 4,104,633 A | * | 8/1978 | Donahue et al. | ............... | 342/93 |
| 4,213,127 A | * | 7/1980 | Cole | ............... | 342/93 |
| 4,422,074 A | * | 12/1983 | Williams et al. | ............... | 342/93 |
| 4,542,381 A | * | 9/1985 | Wilhelm | ....................... | 342/93 |
| 4,713,664 A | * | 12/1987 | Taylor, Jr. | ..................... | 342/91 |
| 5,038,145 A | * | 8/1991 | DeCesare et al. | ............. | 342/93 |
| 5,287,114 A | * | 2/1994 | Desodt et al. | ................ | 342/91 |
| 5,465,095 A | | 11/1995 | Bryant | | |
| 5,546,089 A | | 8/1996 | Talbot | | |
| 6,040,797 A | | 3/2000 | Hofele | | |
| 6,252,540 B1 | * | 6/2001 | Hale et al. | ................... | 342/159 |
| 6,259,396 B1 | * | 7/2001 | Pham et al. | .................. | 342/90 |

FOREIGN PATENT DOCUMENTS

| | | |
|---|---|---|
| EP | 0 334 560 A2 | 9/1989 |
| WO | WO 00/30264 A1 | 5/2000 |

OTHER PUBLICATIONS

International Search Report of PCT Application No. PCT/US03/06959 dated Sep. 12, 2003.
International Search Report of PCT Application No. PCT/US03/06958 dated Jul. 17, 2003.

* cited by examiner

*Primary Examiner*—Bernarr E. Gregory
(74) *Attorney, Agent, or Firm*—Daly, Crowley & Mofford, LLP

(57) ABSTRACT

This invention relates to an adaptive detection system and method for analyzing range-doppler-azimuth data for target detection. The detection system has a threshold calculator for calculating a threshold value that is based on the standard deviation of the range-doppler-azimuth data and a predetermined probability of detection. The detection system also has a detection module in communication with the threshold calculator to receive the threshold value. The detection module calculates an estimated target amplitude and an estimated noise floor amplitude based on the range-doppler data that is located in a detection window. The detection module detects a target when the difference between the estimated target amplitude and the estimated noise floor amplitude is larger than the threshold value.

32 Claims, 13 Drawing Sheets

ADAPTIVE SYSTEM AND METHOD FOR RADAR DETECTION

CROSS REFERENCE TO RELATED APPLICATIONS

This application claims priority under 35 U.S.C. §119 (e) to provisional application Ser. No. 60/363,569 filed Mar. 13, 2002, and to provisional application Ser. No. 60/365,191 filed Mar. 19, 2002, the disclosures of which are hereby incorporated by reference.

FIELD OF THE INVENTION

The present invention relates to radar detection, and more particularly, to a system and method for adaptive detection of radar targets.

BACKGROUND OF THE INVENTION

High Frequency Surface Wave Radar (HFSWR) is effective for the continuous detection and tracking of ships, aircraft, icebergs and other surface targets from a shore based location. Accordingly, HFSWR is being used to enhance search and rescue activities as well as to monitor sea state, illegal immigration, drug trafficking, illegal fishing, smuggling and piracy in the Exclusive Economic Zone.

An HFSWR system, installed along a coastal line, comprises a directional transmitting antenna and a receiving antenna array that are directed towards the ocean as well as the hardware and software needed for system operation. The transmitting antenna generates a train of electromagnetic (EM) pulses which illuminate a desired surveillance area. The receiving antenna array should preferably have high and equal gain over the entire surveillance area. Objects in the surveillance area then reflect the EM pulses towards the receiving antenna array which collects radar data. Some of the objects may be elements that must be detected (referred to as "targets") while the rest of the objects are elements that do not have to be detected (referred to as "clutter"). More sophisticated pulse-coded or frequency-coded EM pulses may be used to combat range-wrap which occurs when a reflected EM pulse (in response to a previously transmitted EM pulse) is received by the receiving antenna array after subsequent EM pulses have been transmitted.

Conventionally, the radar data collected from each antenna element or sensor in the receiving antenna array is then preprocessed by passing the data through a bandpass filter to filter extraneous unwanted signals in the radar data, and then through a heterodyne receiver which demodulates the radar data from the RF band to an IF band where analog to digital conversion occurs. The radar data is then demodulated to the baseband where low-pass filtering and downsampling occurs. The radar data collected by the receiving antenna array is complex (i.e. has real and imaginary components). Accordingly, the downsampled radar data is also complex and each of the signal processing components required to perform the above-mentioned operations are implemented to handle complex data.

The downsampled radar data is then processed by a matched filter that has a transfer function or impulse response that is related to the transmitted EM pulse. The match filtered radar data is then separated into segments for analysis. Each segment is known in the art as a coherent integration time (CIT) or a dwell. The notched filtered radar data in each CIT is range-aligned by noting the time at which each data point was sampled relative to the time that a preceding EM pulse was transmitted. The range-aligned data may then be subjected to a combination of low-pass filtering for further noise reduction and downsampling for more efficient signal processing. The output of this processing is a plurality of time series of range data where each time series is collected for a given range value. The maximum range value for which the plurality of time series is collected depends on the pulse repetition interval used in transmitting the EM pulses (i.e. the frequency at which EM pulses are transmitted).

A target is detected from range, doppler and azimuth information that is generated from the recorded radar data. The range information is used to provide an estimate of the target's distance from the receiving antenna array. The azimuth information is used to provide an estimate of the angle of the target's location with respect to the center of the receiving antenna array and the doppler information is used to provide an estimate of the target's radial velocity by measuring the target's doppler shift. The target's doppler shift is related to the change in frequency content of the EM pulse that is reflected by the target with respect to the original frequency content of that EM pulse.

As mentioned previously, range data is generated by noting the time at which data is sampled relative to the time at which a preceding EM pulse is transmitted. Doppler processing corresponds to the detection of a sinusoidal signal of frequency $\Delta f$ at the pulse repetition period (i.e. the time between consecutive transmitted pulses in the coherent pulse train). Accordingly, doppler information is generated for a given range value by subjecting the time series obtained for that range value to comb filter processing, filter bank processing or FFT processing. The azimuth data is conventionally obtained by digital beamforming. More specifically, the radar data at a given range cell and a given doppler cell is weighted by a complex exponential for each antenna element of the receiving antenna array and then summed across all antenna elements. The phase of the complex exponential is related to an azimuth angle, the antenna element spacing and the wavelength of the transmitted EM pulses as is well known to those skilled in the art. Beamforming gives the appearance that the antenna array is tuned to a certain region of the surveillance area defined by the azimuth value used in the complex exponential weights. In this fashion, many beams may be formed to simultaneously cover the entire surveillance area.

To determine a target's range, azimuth and velocity, a detector processes the generated range, azimuth and doppler information for a given CIT. In general, the detector looks for peaks at a given cell (i.e. a data value or pixel) in a two dimensional plot known as a range-doppler plot. Target detection usually comprises comparing the amplitude in a given cell with the average amplitude in neighboring cells. The detected targets are then forwarded to a plot extractor which filters the detected targets to reject all of those detections that do not conform to the range, doppler and azimuth properties that are expected for a true target. These filtered targets are then forwarded to a tracker which associates successive detections of a given target to form a track for the target. In this fashion, the movement of the target may be tracked throughout the surveillance area.

The detection process is hindered by the addition of noise, which includes the clutter previously mentioned, in each cell. This may result in the missed detection of a target or the false detection of noise as a target. The noise is problematic since there will be a varying noise level in different cells as well as for radar data collected in different CITs, in different sea-state conditions, during different times of day and season and at different locations. The major sources of radar noise include self-interference, such as ocean clutter and ionospheric clutter, and external interference. Self-interference results from the operation of the radar while external interference is independent of the operation of the radar.

Ionospheric clutter, one of the most significant causes of interference, includes EM pulses that reflect off of the earth's ionosphere and return directly to the radar (i.e. near vertical incidence clutter), and EM pulses that bounce off of the ionosphere, reflect from the ocean and return to the radar along the reverse path (i.e. sky-wave self-interference or range-wrap clutter). In general, ionospheric clutter accumulates in an annular band spanning several range cells, all azimuth cells and most of the ship doppler band. This narrow band of range cells corresponds to the height or multiple heights of the ionospheric layers relative to the HFSWR installation site. Near vertical incidence ionospheric clutter is also characterized as being very strong, isolated in range and smeared in the doppler dimension over many milli-Hertz. During the night, ionospheric clutter is at its highest level due to the disappearance of the D layer and the merging of the F1 and F2 layers. Furthermore, the characteristics of ionospheric clutter vary with season and other environmental parameters so it is not easy to introduce a robust method to suppress ionospheric noise.

The sea surface comprises a number of waves having different wavelengths and amplitudes. Ocean clutter results from EM pulses that are reflected by ocean waves that are harmonics of the radar wavelength. Two large peaks that dominate the ocean clutter are referred to as Bragg lines which appear as two columns of peaks in a range-doppler plot along all range cells at doppler frequencies determined by the radar operating frequency. The Bragg lines can smear radar detection performance at their corresponding doppler frequencies. However, there is also higher order scatter, related to the sea-state, that results in additional peaks and a continuum of ocean clutter between the Bragg lines. This continuum of ocean clutter contains energy that is related to the sea-state (i.e. surface wind speed and duration) and often limits the detection of small, low-speed targets such as ships.

External interference includes co-channel interference, atmospheric interference and impulsive noise. Co-channel interference results from both local and distant users of the HFSWR frequency band, such as television broadcasters. This interference is range independent and occurs at specific doppler ranges. This interference is also highly directive because it originates from spatially correlated point sources. Co-channel interference may be avoided by choosing alternate carrier frequencies for transmitting the EM pulses. However, co-channel interference from distant sources poses a more serious problem since this interference is more random in time and frequency. Furthermore, there is typically greater co-channel interference at night than during the day due to the lack of D layer absorption during the night.

Atmospheric interference is spatially white with a level that varies as a function of frequency, time of day, season and geographical location. For instance, the noise level due to atmospheric interference at the lower end of the HF band, increases about 20 dB during the night in comparison with daytime levels.

Impulsive noise is due to lightning and manifests itself as a sequence of rapid pulses that are randomly distributed in time and have an amplitude with a large dynamic range. Impulsive noise is not spatially white and results from both local and distant storms. Impulsive noise usually occurs throughout the daily operation of an HFSWR system. Impulsive noise has a doppler spread that is relatively short in duration and may resemble a maneuvering target. Impulsive noise results in an increase in the background noise level. The frequency characteristics of impulsive noise change as a function of the intensity of local storm activity.

Spatially non-white external interference and ocean clutter may be successfully reduced by using sophisticated signal processing methods developed by the inventors of the present invention and described in co-pending patent applications filed concurrently herewith, the first application having Ser. No. 10/383,775 and entitled "System and Method For Spectral Generation in Radar" and the second application having Ser. No. 10/384,203 and entitled "A Noise Suppression System and Method for Phased-Array Based Systems". However, after applying these signal processing methods, the radar data still contains noise, the majority of which is spatially white noise due mostly to atmospheric interference. As previously mentioned atmospheric interference is problematic since it results in a noise level that is quite variable.

The variability in noise level due to atmospheric interference affects the detection performance of the HFSWR system in several ways. This noise can result in the missed detection of a target, since the target is indistinguishable from the noise, or the false detection of noise as a target. In addition, the detector of the HFSWR system will output a widely varying number of detections in each CIT since the noise level is so variable over time. This has a detrimental effect on the components of the HFSWR system that follow the detector (i.e. the plot extractor and the tracker). In particular, if too many detections are made by the detector then the tracker of the HFSWR system will become overloaded. It is thus preferable to have a detector that provides a relatively constant number of detections in each CIT regardless of the varying noise level due to atmospheric interference.

It is well known in the art to use a Constant False Alarm Rate (CFAR) detector to provide relatively stable detection performance. In general, a conventional CFAR detector estimates the local noise level for a given range-doppler cell and detects a target at the given range-doppler cell when the amplitude of the radar data of the range-doppler cell is larger than the estimated noise level plus a threshold. In a conventional CFAR detector, the value of the threshold is usually constant. However, because the noise level due to atmospheric interference is quite variable and the noise and the target do not add coherently, the amplitude difference between the target and the noise will also vary. Thus, a conventional CFAR detector will not detect targets having a small amplitude if a constant threshold value is used and the noise level increases. Accordingly, there is a need for a detector which provides a threshold level that can be varied with the noise level to provide a constant detection rate across different CIT's.

Target detection is also challenging due to target properties that vary across targets such as target type (i.e. a ship target, an air target, etc.) and target velocity. For instance, ships provide larger target indications (i.e. a greater number of range-doppler cells) in a range-doppler plot than air targets such as planes. Accordingly, there is a need for a detector that varies detection parameters based on these different target properties.

SUMMARY OF THE INVENTION

In one aspect, the present invention is an adaptive detection system for analyzing range-doppler-azimuth data for target detection. The system comprises a threshold calculator that calculates a threshold value that is based on the standard deviation of the range-doppler-azimuth data and a predetermined probability of detection. The system also comprises a detection module in communication with the threshold calculator to receive the threshold value. The detection module calculates an estimated target amplitude and an estimated noise floor amplitude from range-doppler data that is located in a detection window. The detection module detects a target when the difference between the estimated target amplitude and the estimated noise floor amplitude is larger than the threshold value.

In a second aspect, the present invention provides a detection module for analyzing range-doppler data for target detection. The detection module comprises a window generator for generating a detection window having a target region, a guard region surrounding the target region and a main region surrounding the guard region. The detection module also has a signal calculator in communication with the window generator. The signal calculator calculates an estimated target amplitude and an estimated noise floor amplitude. The estimated target amplitude is preferably a range-doppler cell amplitude at the center of the target region and the estimated noise floor amplitude is preferably an average range-doppler cell amplitude in the main region. The detection module also includes a decision module in communication with the signal calculator. The decision module detects a target when the difference between the estimated target amplitude and the estimated noise floor amplitude is larger than a predetermined threshold value.

In another aspect, the present invention provides an adaptive detection method for analyzing range-doppler-azimuth data for target detection. The detection method comprises:
  calculating a threshold value based on the standard deviation of the range-doppler-azimuth data and a predetermined probability of detection;
  calculating an estimated target amplitude and an estimated noise floor amplitude based on the range-doppler data contained in a detection window; and,
  detecting a target when the difference between the estimated target amplitude and the estimated noise floor amplitude is larger than the threshold value.

In a further aspect, the present invention provides a detection method for analyzing range-doppler data for target detection. The detection method comprises:
  generating a detection window having a target region, a guard region surrounding the target region and a main region surrounding the guard region;
  calculating an estimated target amplitude and an estimated noise floor amplitude, wherein the estimated target amplitude is preferably a range-doppler cell amplitude at the center of the target region and the estimated noise floor amplitude is preferably an average range-doppler cell amplitude in the main region; and,
  detecting a target when the difference between the estimated target amplitude and the estimated noise floor amplitude is larger than a predetermined threshold value;.

BRIEF DESCRIPTION OF THE DRAWINGS

For a better understanding of the present invention and to show more clearly how it may be carried into effect, reference will now be made, by way of example only, to the accompanying drawings which show a preferred embodiment of the present invention and in which:

FIG. 10b is a plot of detection hits obtained from the adaptive CFAR detector of the present invention when applied to the range-doppler plot of FIG. 10a;

FIG. 11b is a plot of detection hits obtained from the adaptive CFAR detector of the present invention when applied to the range-doppler plot of FIG. 11a;

FIG. 12b is a plot of detection hits obtained from the adaptive CFAR detector of the present invention when applied to the range-doppler plot of FIG. 12a;

FIG. 13a is a second high resolution range-doppler plot of real HFSWR data recorded during the winter; and, FIG. 13b is a plot of detection hits obtained from the adaptive CFAR detector of the present invention when applied to the range-doppler plot of FIG. 13a.

DETAILED DESCRIPTION OF THE INVENTION

All of the experimental data described herein has been taken from the SWR-503™ HFSWR system located at Cape Race, Newfoundland, Canada. The SWR-503™ HFSWR system was developed by Raytheon Canada Limited.

As used herein, the term range-doppler-azimuth data means all range-doppler data generated for all azimuths in a given CIT and the term range-doppler means all range-doppler data for a given azimuth (i.e. a range-doppler plot).

Figure 1:
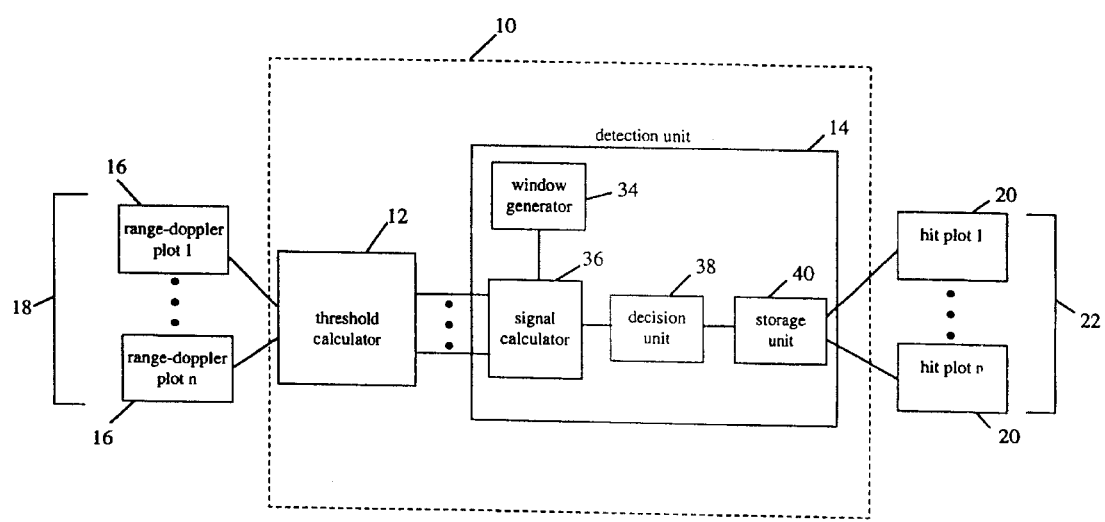
FIG. 1 is a block diagram of an adaptive CFAR detector in accordance with the present invention.
Figure 10A:
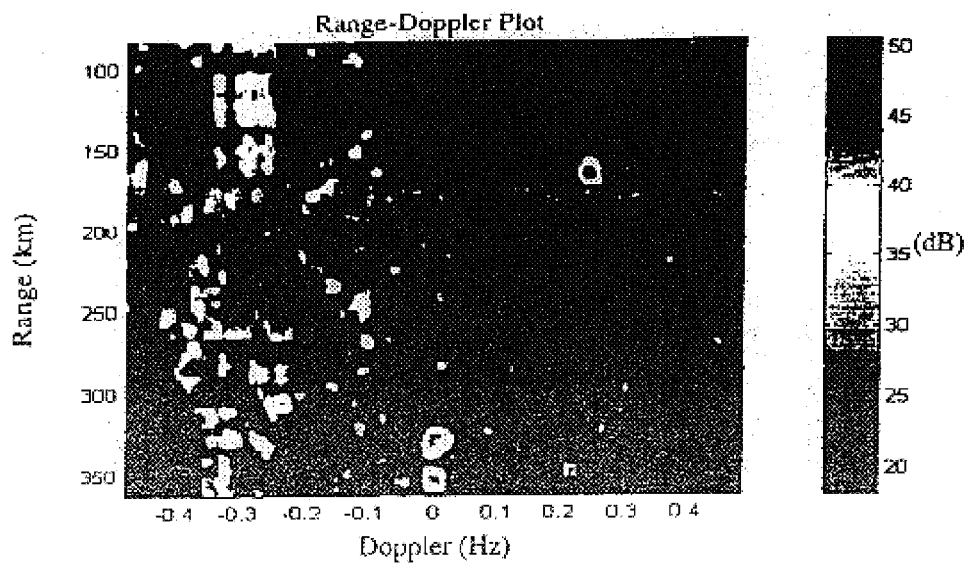
FIG. 10a is a high resolution range-doppler plot of real HFSWR data recorded during the fall.
Figure 10B:
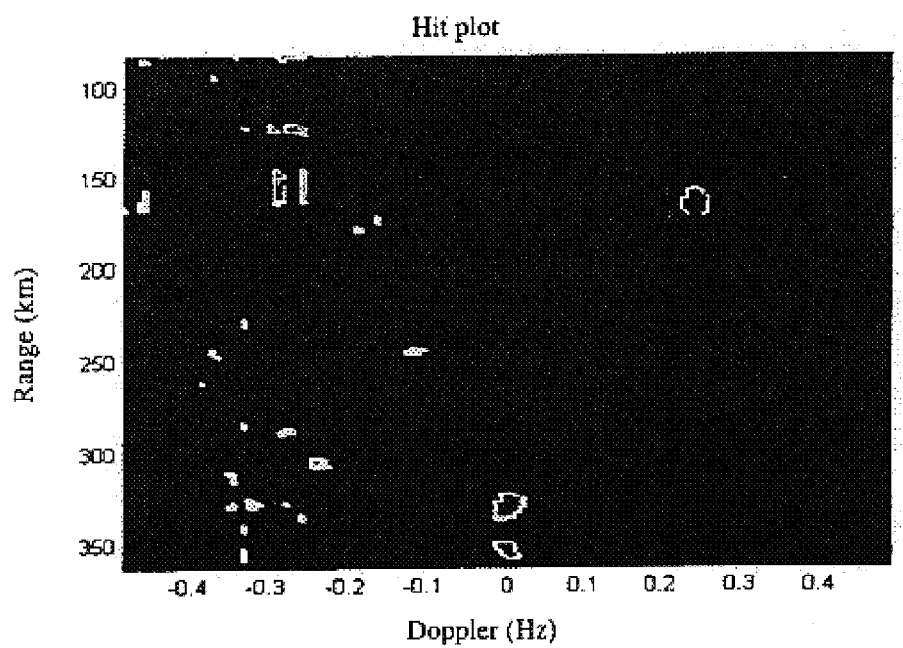

Reference is first made to FIG. 1, which shows a preferred embodiment of an adaptive detection system 10 in accordance with the present invention. The adaptive detection system 10 comprises a threshold calculator 12 and a detection module 14. The adaptive detection system 10 detects targets for a given range-doppler plot 16 selected from a plurality of range-doppler plots 18 (generated during a given CIT) and may produce a hit plot 20 which shows the locations of the detected targets. FIGS. 10a and 10b are examples of a range-doppler plot and a hit plot respectively. The adaptive detection system 10 may be used to generate one hit plot 20 for each range-doppler plot 16. Alternatively, a plurality of hit plots 22 may be generated by the adaptive detection system 10 when a plurality of range-doppler plots 18 are processed.

Figure 2A:
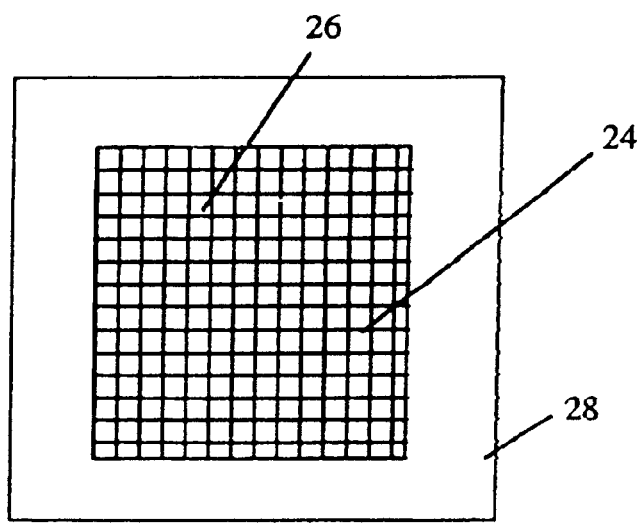
FIG. 2a is a plot illustrating the active area and guard area of a range-doppler plot in accordance with the present invention.
Figure 2B:
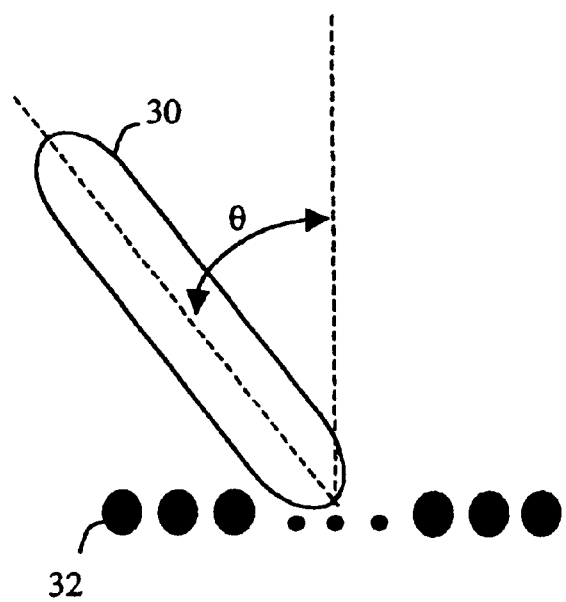
FIG. 2b is a diagram illustrating the concept of azimuth.

Referring now to FIG. 2a, each range-doppler plot 16 is defined as having an active area 24 having a plurality of cells 26 and a guard area 28 also having a plurality of cells (not shown). FIG. 2a is not to scale and will contain many more cells 26 than those shown. The need for a guard area 28 will be explained further below. Each cell 26 in the active area 24 is processed by the adaptive detection system 10 to determine whether each cell 26 has a target. The cells in the guard area 28 are not processed for target detection. Furthermore, each range-doppler plot 16 is generated for a given azimuth. As is known to those skilled in the art, the radar data in each range-doppler plot 16 has been subjected to conventional signal processing operations for pre-processing which includes bandpass filtering, heterodyning, A/D conversion, demodulation downsampling, and matched filtering. Referring to FIG. 2b, the azimuth is the horizontal angle θ that the main beam 30 of the receiving antenna array 32 makes with respect to the midpoint of the receiving antenna array 32 as is commonly known to those skilled in the art.

Referring again to FIG. 1, the threshold calculator 12 calculates a threshold value based on the statistical properties of the range-doppler-azimuth data obtained during a given CIT and a predetermined probability of detection. This information is obtained from the plurality of range-doppler plots 18. The threshold value remains constant for every cell 26 that is processed by the adaptive detection system 10 in a given range-doppler plot 16 for a given CIT. When range-doppler-azimuth data from a new CIT is processed, a new threshold value is calculated.

The detection module 14 includes a window generator 34, a signal calculator 36, a decision module 38 and a storage module 40, connected as shown in FIG. 1. For a given detection mode, the window generator 34 generates a detection window as described further below. For a given range-doppler plot 16, the detection window is centered on a cell 26 to provide range-doppler values that are used by the signal calculator 36 to calculate an estimated target level and an estimated noise level local to the cell 26. The decision module 38 then declares a detection (i.e. a hit) if the difference between the estimated target level and the estimated noise level is larger than the threshold value. In this fashion, target detection is performed for every cell 26 in the given range-doppler plot 16. The range-doppler locations of all detected targets are stored by the storage module 40. The locations of the detected targets may be shown in the hit plot 20 that corresponds to the given range-doppler plot 16. The hit plot 20 may be a binary mask having a value of 1 at cells where detected targets exist and a value of 0 at all other cells.

The elements of this invention may be implemented through any means known in the art such as through the use of dedicated hardware such as a digital signal processor, or with discrete components such as comparators, multipliers, shift registers, memory and the like. The elements of this invention may also be implemented via a computer program which may be written in Matlab, C, C++, Labview™ or any other suitable programming language embodied in a computer readable medium on a computing platform having an operating system and the associated hardware and software that is necessary to implement the adaptive detection system 10. The computer program would comprise computer instructions that are adapted to perform the steps of the adaptive detection method described further below. The computer programs may comprise modules or classes, as is well known to those skilled in object oriented programming, that are implemented and structured according to the adaptive detection system 10 shown in FIG. 1. Accordingly, separate software modules may be designed to implement the threshold calculator 12, the window generator 34, the signal calculator 36 and the decision module 38. Alternatively, the functionality of these structures may be combined into one or two software modules. Furthermore, the storage module 40 may be any suitable computer storage device or a database system.

Figure 3B:
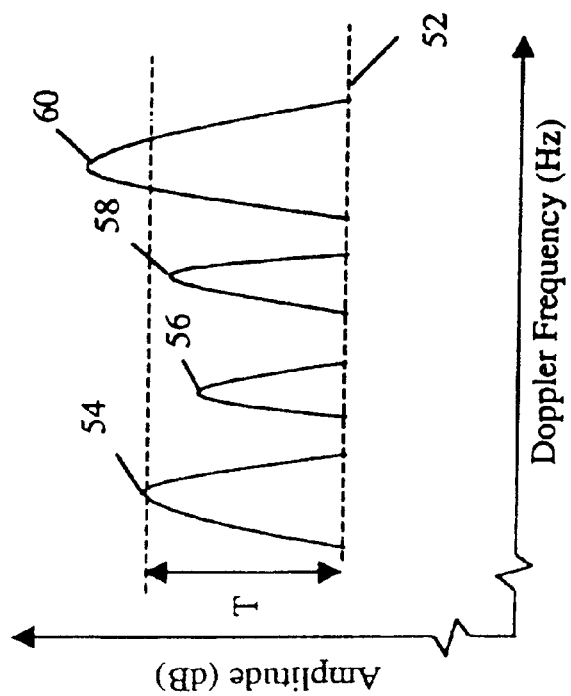
FIG. 3b is the same portion of the Doppler spectrum shown in FIG. 3a with a higher noise level.
Figure 3A:
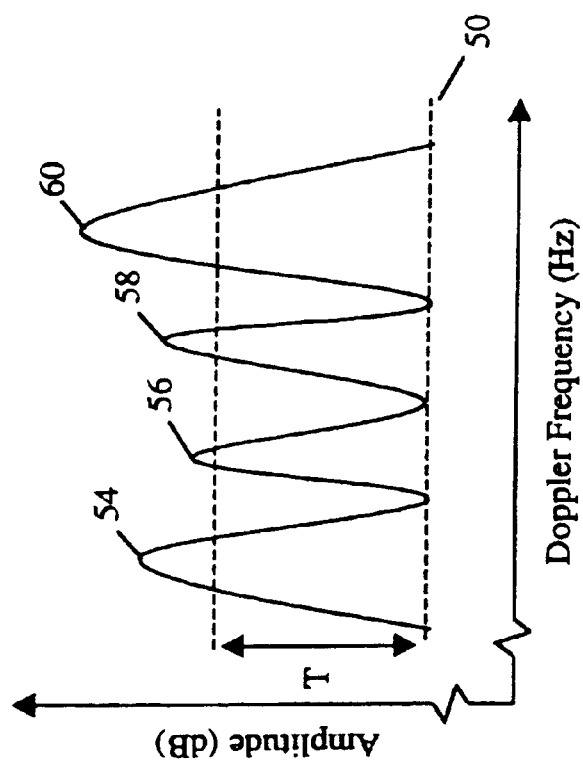
FIG. 3a is a portion of the Doppler spectrum at a given range for a low noise level.

Reference is now made to FIGS. 3a and 3b which depict the interaction between noise level and target amplitude in a portion of a slice of a range-doppler plot (i.e. a portion of the Doppler spectrum for a given range). As mentioned in the background section, the noise level due to atmospheric interference varies with time of day, time of season and geographical location. This variance in noise level can be seen by a change in the level of the noise floors 50 and 52 in FIGS. 3a and 3b respectively. The higher noise floor level 52 in FIG. 3b results in a smaller distance between the peaks of the targets 54, 56, 58 and 60 and the noise floor level 52 compared to the distance between the peaks of the targets 54, 56, 58 and 60 and the noise floor level 50 shown in FIG. 3a. As a result, when a conventional CFAR detector is used, which uses the same threshold T for radar data obtained during different CITs, the targets 54, 56, 58 and 60 will be detected when the background noise has the noise floor level 50 but only targets 54 and 60 will be detected when the background noise has the noise floor level 52. Therefore a conventional CFAR detector will provide varying detection performance. In order to avoid this problem, the threshold level should be adaptively calculated such that when the noise level increases, the threshold level decreases and when the noise level decreases, the threshold level increases. To accomplish this, the statistical properties of the range-doppler-azimuth data for representative CITs must be known.

The statistical properties of range-doppler-azimuth data for several CITs was studied using data from range-doppler plots that were produced by a high resolution spectral estimator such as the MUSIC (Multiple Signal Classification) spectral estimator or the root-MUSIC spectral estimator. The analysis comprised constructing histograms based on the amplitude values (in dB) from all of the range-doppler-azimuth data that were obtained for a given CIT. Accordingly, the number of range-doppler plots generated depended on the number of azimuths that were examined by the HFSWR system in one CIT.

Figure 4A:
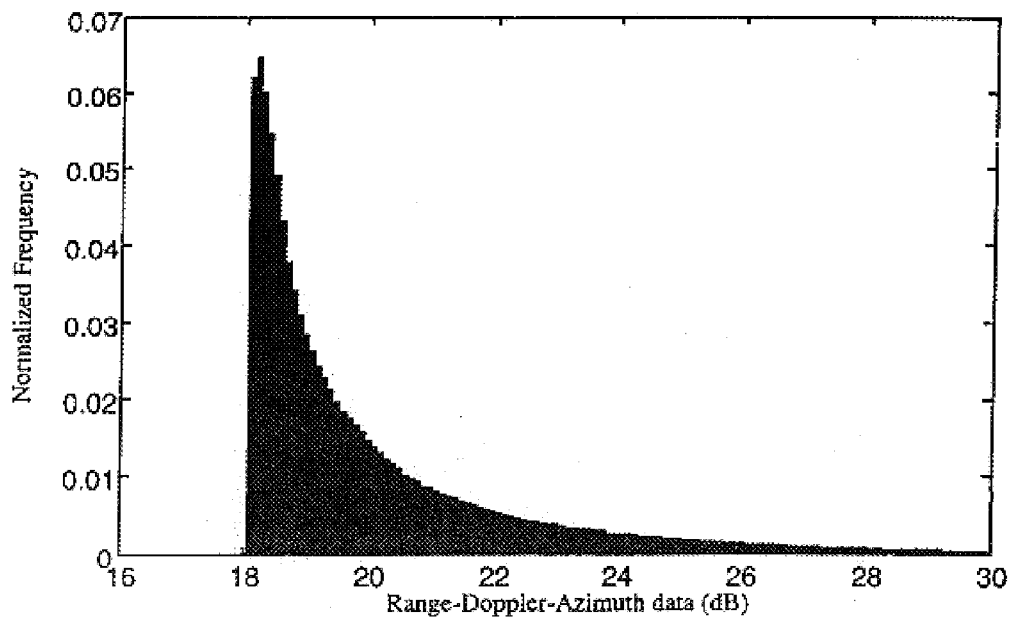
FIG. 4a is a normalized histogram of real HFSWR data recorded during the fall.

Referring now to FIG. 4a, shown therein is a normalized histogram of real range-doppler-azimuth data obtained during the fall season. The x axis is amplitude in dB and the y axis is normalized frequency (i.e. the number of range-doppler-azimuth data values having a certain amplitude divided by the total number of range-doppler-azimuth data values used to produce the histogram). This scaling resulted in a histogram area of 1 to estimate the probability distribution function (pdf) for the range-doppler-azimuth values.

Figure 4B:
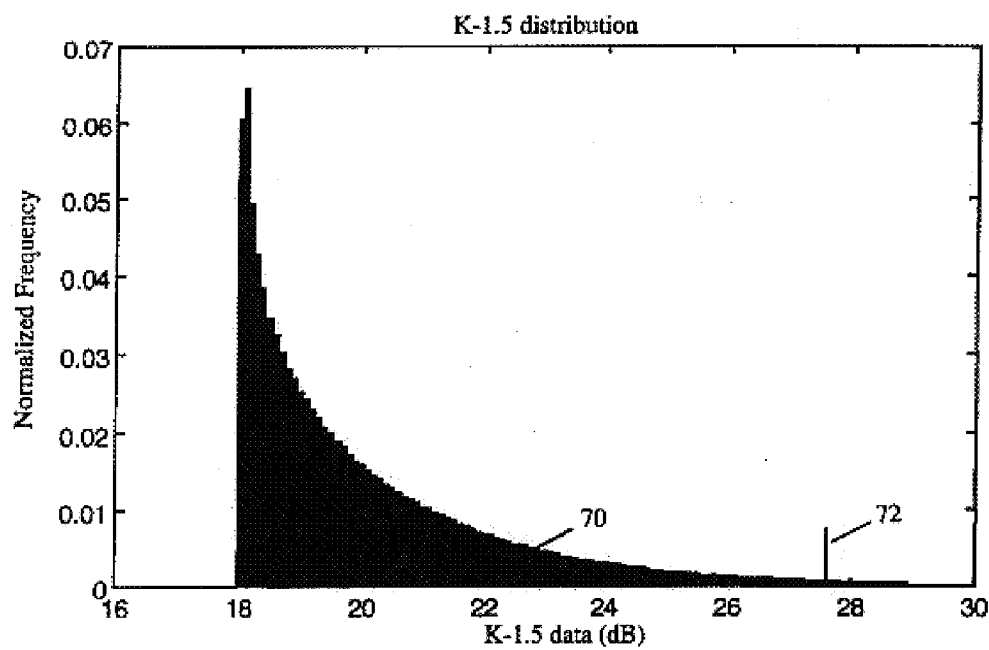
FIG. 4b is a normalized histogram of simulated data having a $\chi^{1.5}$ distribution.

Referring now to FIG. 4b, shown therein is a normalized histogram of simulated data having a $\chi^{1.5}$ distribution. The x axis and y axis of the histogram are scaled similarly to the axes shown in FIG. 4a. Upon comparing FIGS. 4b and 4a, it is apparent that the range-doppler-azimuth data in dB, with a mean equal to the noise level of the atmospheric interference plus the amplitudes of targets, fairly well approximates the $\chi^{1.5}$ distribution. The histogram also shows that targets behave as additive noise since the tail of the $\chi^{1.5}$ distribution stretches out when there are more targets in the range-doppler-azimuth data. Furthermore, the variance of the range-doppler-azimuth data is produced mainly by the targets that exist in the radar data because the amplitude of the targets is much larger than the noise due to atmospheric interference. This is because the noise resulting from atmospheric interference has become reduced due to the averaging involved in estimating the amplitude spectrum of the range-doppler-azimuth data as is well known to those skilled in the art.

Figure 5A:
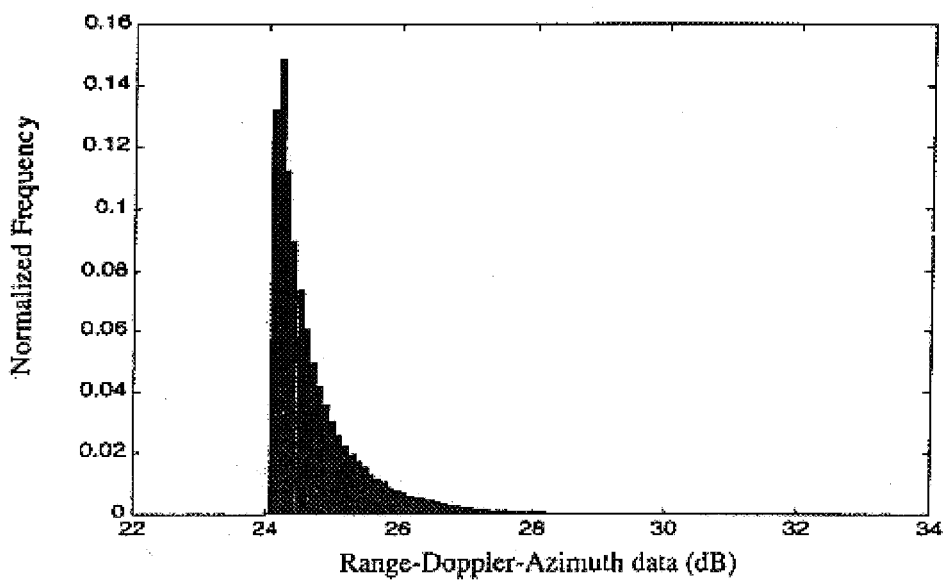
FIG. 5a is a normalized histogram of real HFSWR data recorded during the winter.
Figure 5B:
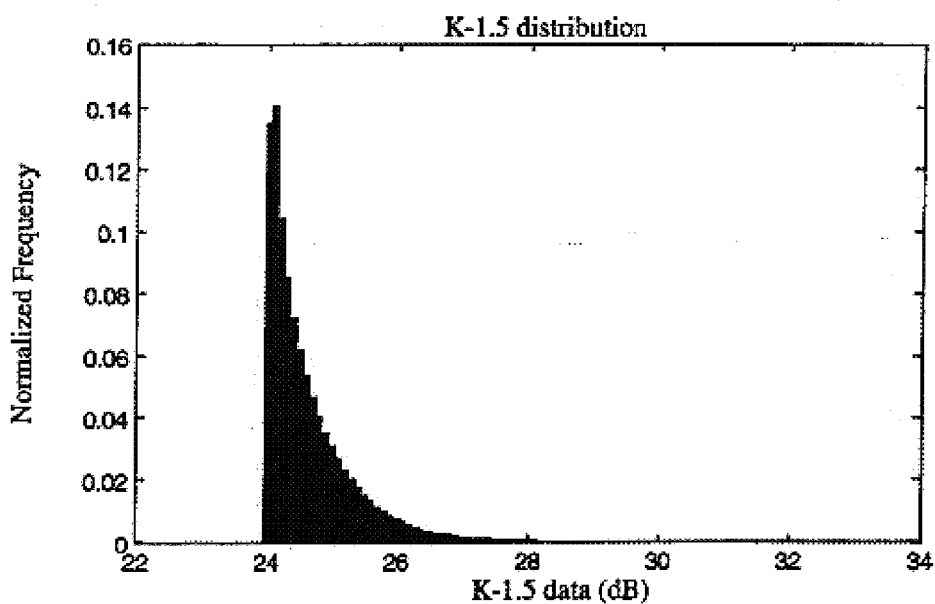
FIG. 5b is a normalized histogram of simulated data having a $\chi^{1.5}$ distribution.

Referring now to FIGS. 5a and 5b, shown therein are normalized histograms of real range-doppler-azimuth data obtained during the winter season and simulated data having a $\chi^{1.5}$ distribution. Upon comparing FIGS. 5a and 5b, it is apparent that the range-doppler-azimuth data in dB, with a mean equal to the noise level of the atmospheric interference plus the amplitude of targets, fairly well approximates the $\chi^{1.5}$ distribution as was seen in the comparison of the histograms of FIGS. 4a and 4b.

Since the pdf of the range-doppler-azimuth data is now known, the next step is to calculate a threshold value to obtain a desired or predetermined probability of detection (PD). The PD is represented herein by the area under the pdf curve and to the left of a threshold value 72 taken along the x axis of the pdf plot such as that shown in FIG. 4b. Since the targets stay at the upper tail of the $\chi^{1.5}$ distribution, setting a threshold value for which 95% of the $\chi^{1.5}$ distribution lies to the left of the threshold value will provide a probability of detection of 95% in the sense that one can be 95% sure that a target with an amplitude that is higher than the threshold value is truly a target instead of noise since 95% of the noise distribution lies beneath this threshold value in amplitude. Looking at it from a statistical perspective, setting a threshold value such that 95% of the distribution lies to the left of the threshold value results in at most 5% of the range-doppler-azimuth points for a given CIT being recorded as a detection. Actually, the experimental results shown further below indicate that less than 1% of the range-doppler-azimuth data points in a CIT are detected as targets when the threshold is set according to this 95% criteria due to the CFAR processing that is used by the adaptive detection system 10.

To determine a threshold value based on a desired or predetermined PD, one may refer to a statistical table for a $\chi^{1.5}$ distribution and determine the value of $\lambda/\sigma$, herein denoted as X, which provides a percentile that is equal to the desired PD. The threshold value is represented by $\lambda$ and the standard deviation of the data having a $\chi^{1.5}$ distribution is represented by $\sigma$. For example, a PD of 90% results in X=1.7 and a PD of 95% results in X=1.8.

Based on the above description, setting an appropriate threshold value for the range-doppler-azimuth data obtained for a given CIT should provide an upper limit on the number of detections obtained for that CIT. However, to keep false target detection (i.e. false alarms) to a reasonable level, a CFAR detection scheme should be used. The false targets come mainly from the spectral leakage of the Bragg lines and the ionospheric clutter when high-resolution spectral estimation techniques are used to produce range-doppler plots.

Figure 6:
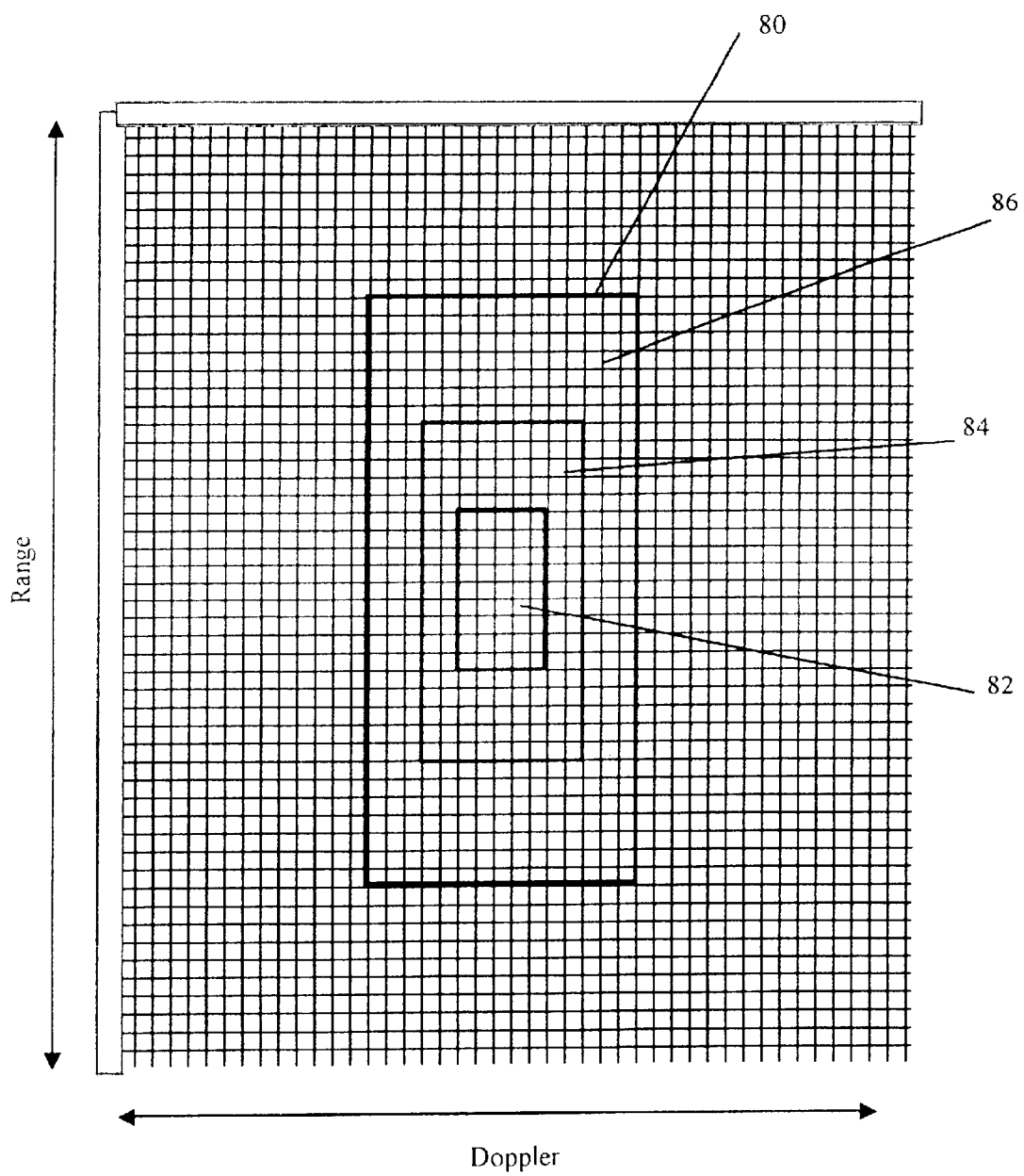
FIG. 6 is an adaptive detection window in accordance with the present invention.

To obtain a good estimate of the background noise level, a thresholding method based on a detection window 80 that employs an adaptive CFAR design is used for the detection module 14 to obtain robust signal and noise estimates. Referring to FIG. 6, the detection window 80 is shown along with the cells of a portion of a range-doppler plot. The detection window 80 is designed such that the cells around a potential target in a range-doppler plot are divided into three regions comprising a target region 82, a guard region 84 and a main region 86. In the example shown in FIG. 6, the target region 82 is a square that is preferably 9 cells high in the range dimension and 5 cells wide in the doppler dimension, the guard region 84 is a ring preferably having a height of 5 range cells above and below the target region 82 and a width of 2 doppler cells on either side of the target region 82 and the main region 86 is a ring preferably having a height of 7 range cells above and below the guard region 84 and a width of 3 doppler cells on either side of the guard region 84. These dimensions are provided as an example. Accordingly, other dimensions may be used.

The size of the regions will affect the statistical robustness of the detection unit 14. If the regions are too large then the cells in each region will not be representative of the information that is local to a potential target. In general, the number of cells in each region depends on the cell-to-cell dependence (i.e. how correlated the radar data in each cell is to each other) which in turn depends on the signal processing parameters used while creating the range-doppler plot such as range resolution, doppler resolution and the method of spectral estimation. The size of the target region 82, the guard region 84 and the main region 86 will also vary depending on the radar configuration and type of targets that are to be detected. Accordingly, the adaptive detection system 10 may operate in different detection modes such as an air mode to detect air targets and a ship mode to detect ship targets. Another mode may be iceberg mode. The adaptive detection system 10 may use a detection window 80 as shown in FIG. 6. When the detection mode is set to ship mode, a typical detection window 80 may have a target region with a size of 7 range cells by 3 doppler cells and the guard and main regions 84 and 86 with sizes shown in FIG. 6. Alternatively different sizes may be used for the guard and main regions 84 and 86.

Figure 7:
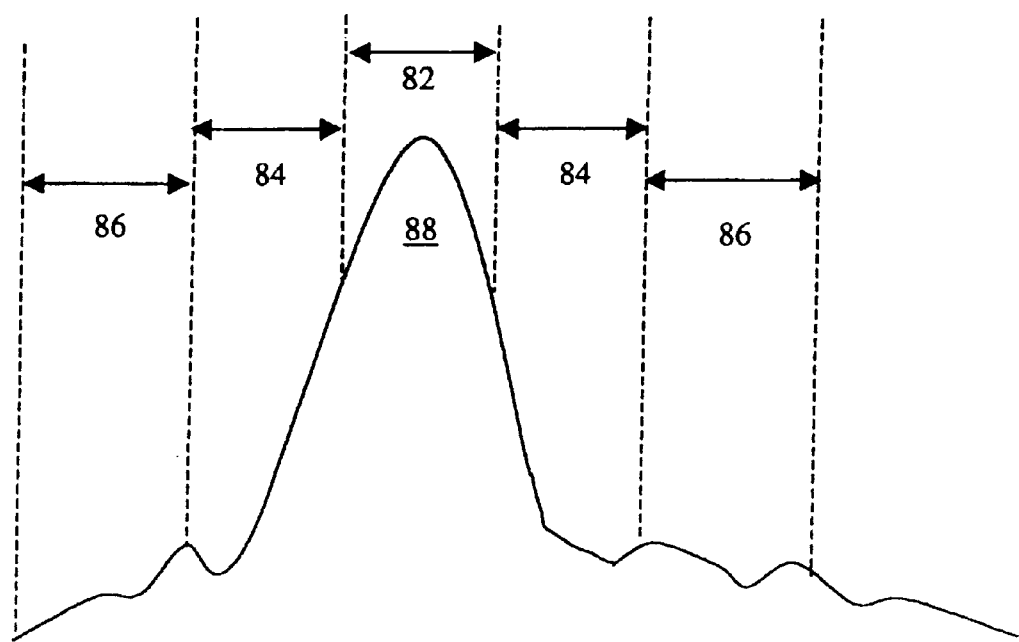
FIG. 7 is a portion of the Doppler spectrum of a target at a given range.

Regardless of whether the adaptive detection system 10 is operating in air mode or ship mode, the target region 82 is designed to include the number of range-doppler cells that a target would normally occupy given the radar operational parameters discussed above. Furthermore, the maximal amplitude of the target should preferably lie at the center of the target region 82 when the detection window 80 is centered on the target. The guard region 84 is designed to include the side portions of the target which will be smaller in amplitude than the maximal amplitude (i.e. central portion) of the target that is contained in the target region 82. This is a result of spectral estimation, in which, due to finite data in time or space, the spectral estimate of a target will not be a sharp peak in the frequency or spatial domain but will tend to be spread out and gently decrease in amplitude away from the main peak of the target. The main region 86 is designed to include the background noise. This is shown graphically in FIG. 7 in which, for a given range, a slice of the target region 82, the guard region 84 and the main region 86, centered about a target 88 in the Doppler dimension is shown.

Figure 8:
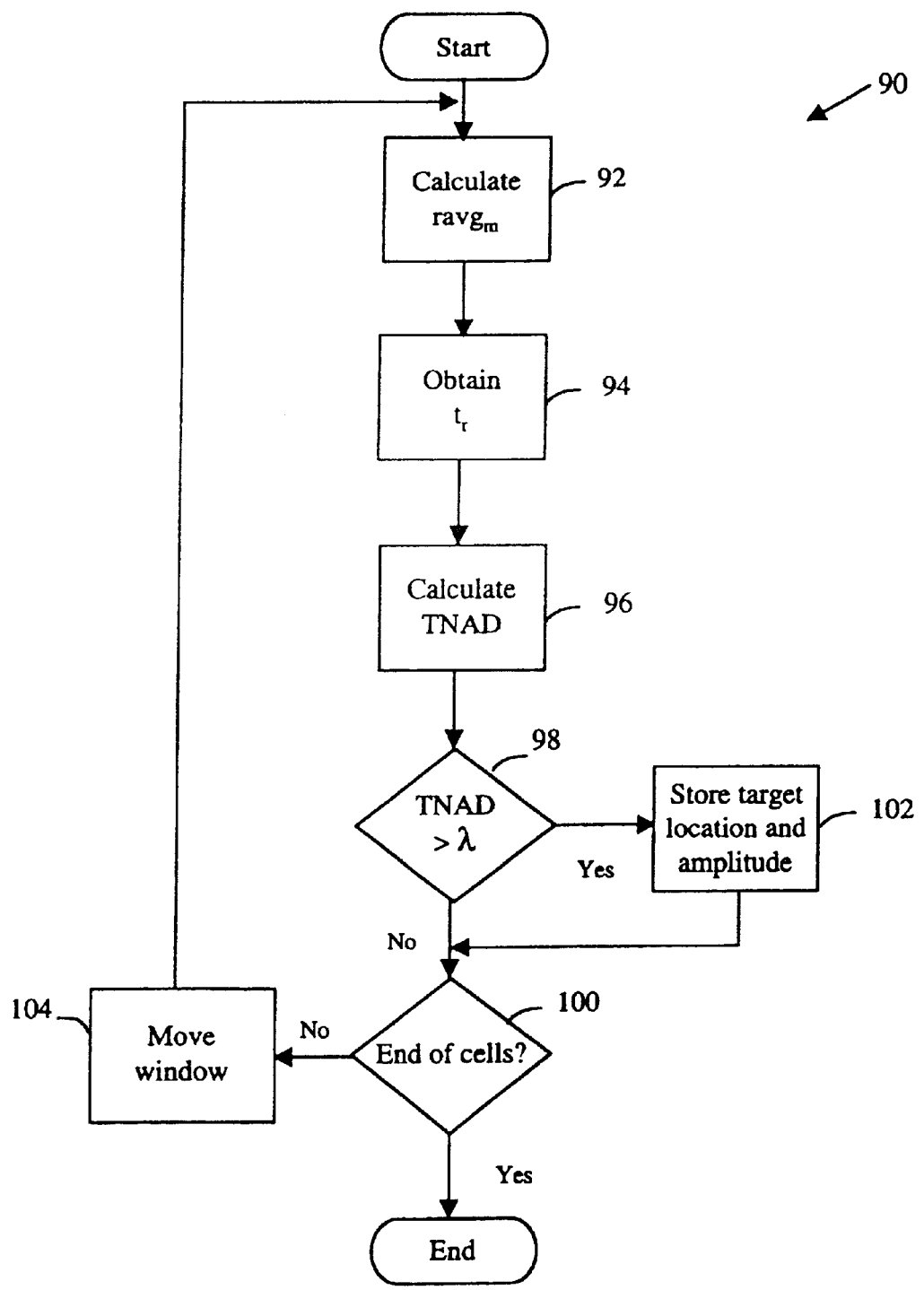
FIG. 8 is a flowchart of the detection process performed by the detector.

Referring now to FIG. 8, shown therein is a flowchart of a detection method 90 performed by the detection module 14 for a given range-doppler cell. The detection method 90 starts at step 92 where the average amplitude of the radar data (ravg$_m$) is calculated for the main region 86 which is the sum of the range-doppler data amplitudes of each cell in the main region 86 divided by the number of cells in the main region 86. This provides an estimate of the noise level amplitude. The noise level is an "estimate" in the statistical sense, since a few radar data values in one sample observation from a population of samples are used to estimate the noise level amplitude. The next step 94 is to obtain an estimate of the target amplitude (r$_t$) which is the amplitude of the radar data at the center of the target region 82. Preferably, the target region 82 comprises an odd number of range and doppler cells so that the center of the target region 82 occurs at a single range-doppler cell. The aforementioned calculations are performed by the signal calculator 36.

The next step 96 of the detection method 90 is to calculate the target-noise-amplitude difference (TNAD) between the estimated target amplitude and the estimated noise amplitude according to equation 1:

$$TNAD = r_t - ravg_m \qquad (1)$$

The next step 98 is to determine whether the TNAD is greater than the threshold value λ. These operations are performed by the decision unit 38. If this comparison is false then there is no detected target and the detection method 90 proceeds to step 100. However, if this comparison is true, then the detection method 90 proceeds to step 102 where the central cell in the target region 82 is declared to be a target and the average amplitude of the radar data in the entire target region 82 is returned as the amplitude of the target. This is done to avoid detecting multiple targets due to target-splitting which occurs when a target has been split into two or more peaks by high resolution spectral estimation. If this occurs, a conventional CFAR detector would detect two separate targets when there is only one true target. At step 102, the range, doppler and azimuth values of the target region 82 may be stored. This operation is performed by the storage module 40. The detection method 90 then moves to step 100 where it is determined whether the last cell has been processed in the current range-doppler plot. If not, the detection method 90 moves to step 104 where the detection window 80 is shifted to the next cell in the range-doppler plot and the detection method 90 is repeated.

The detection method 90 may start at the upper left corner of the active area 24 of a range-doppler plot and process every doppler cell in that row (i.e. at a given range value) until the last doppler cell in the row is processed. The detection window 80 may then be moved down 1 range cell and placed at the left-most doppler cell in the active area 24 and all of the doppler cells in that row (i.e. range) may be processed. In this fashion all of the range-doppler cells for a range-doppler plot are processed by the detection module 14. Alternatively, other methods of moving the detection window 80 over the cells of a range-doppler plot may be used.

When the detection window 80 is operating on cells near or at the edges of the active area 24, the cells in the guard area 28 are used to calculate the ravg$_m$ value needed in equation 1. This is the reason for the incorporation of the guard area 28 around the active area 24 of a range-doppler plot. Accordingly, detection is performed for only those cells that are in the active area 24 of a range-doppler plot 16.

Equation 1 uses the amplitude at the center of the target region 82 as the estimated target amplitude to reduce the probability of missing the detection of a target having a small amplitude (i.e. the target amplitude would be smoothed over the cells in the target region 52 if averaging were used to estimate target amplitude). In addition, the difference between r$_t$ and ravg$_m$ in equation 1 is used to remove the portion of the target that is in the main region 56 to obtain a more accurate estimate of the background noise (i.e. see FIG. 7). Furthermore, choosing the size of the target region 82 based on the range and doppler resolution of the HFSWR system and detection mode (i.e. the type of target being detected) is beneficial in ensuring that the detection window 80 is sized to match the target shape. In this sense, the detection window 80 is actually an adaptive detection window that is varied depending on the operational parameters of the radar system and the detection mode.

It should also be apparent that the detection window 80 and the detection method 90 can be applied to a range-doppler plot produced by any spectral estimator. In this case, the statistics of the range-doppler-azimuth data will likely change which will affect the calculation of the threshold value. In the present invention, the MUSIC spectral estimator is used which has affected the calculation of the threshold value λ.

Figure 9:
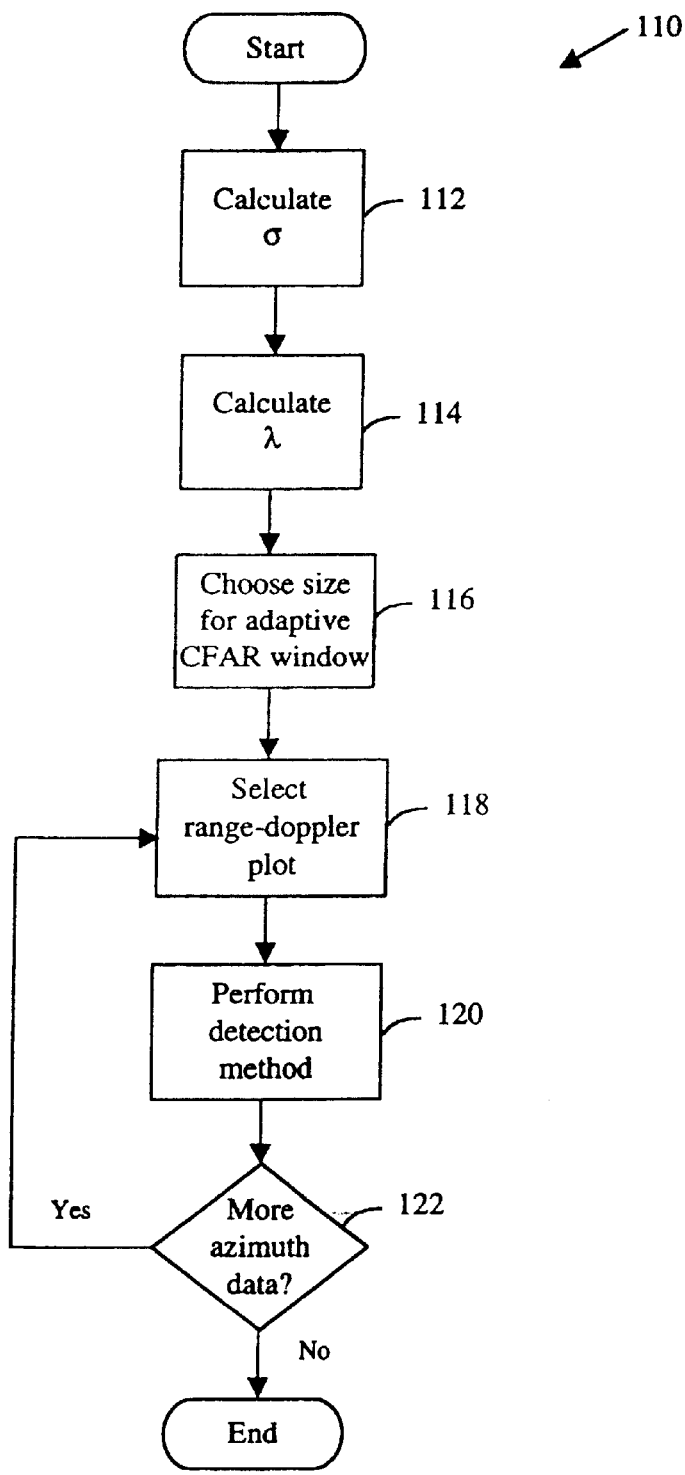
FIG. 9 is a flowchart of an adaptive CFAR detection method in accordance with the present invention.

Referring now to FIG. 9, shown therein is a flowchart for an adaptive detection method 110 in accordance with the present invention. Given range-doppler-azimuth data in dB for a CIT, the adaptive detection method 110 begins at step 112 where the standard deviation (σ) of the data is calculated according to equation 2:

$$\sigma = \sqrt{\frac{\sum_{i=1}^{N}(RDA_i - RDA_m)^2}{N-1}} \qquad (2)$$

where RDA$_i$ is a range-doppler-azimuth data value, RDA$_m$ is the mean of the range-doppler-azimuth data values and N is the number of range-doppler-azimuth data values. The next step 114 is to choose a desired probability of detection (i.e. a predetermined probability of detection) and calculate a value X for λ/σ from a statistical table for the $\chi^{1.5}$ distribution as described previously. Given X and a calculated value for σ, the threshold value (λ) is then calculated according to equation 3:

$$\lambda = X \cdot \sigma \qquad (3)$$

Next, at step 116, an appropriate detection window 80 is chosen according to the detection mode (i.e. air mode, ship mode, etc.) as well as the operational properties of the HFSWR system such as range resolution and doppler resolution as previously discussed. At step 118, the range-doppler data for a given azimuth (i.e. a range-doppler plot) is selected and at step 120 the detection method 90 is repeated for each range-doppler cell in the current range-doppler plot. When the last range-doppler cell of the current range-doppler plot has been processed, then the range-doppler plot for the next azimuth is processed by the adaptive detection system 10. In this fashion, all of the range-doppler plots generated for a specified set of azimuths in a given CIT are processed by the adaptive detection system 10.

The detection performance of the adaptive detection system 10 for real HFSWR data will now be discussed. Referring to FIG. 10a, shown therein is a high resolution range-doppler plot at an azimuth of −32° relative to the boresight (i.e. center) of the receiving antenna array for the HFSWR system. The HFSWR data was recorded during the fall season. Processing the HFSWR data for a first CIT resulted in 1,326,528 range-doppler-azimuth data points (i.e. 188 range cells×147 doppler cells×48 azimuths). The rangedoppler-azimuth data had a σ of 2.9908 which resulted in a λ of 5.3835 for a PD of 95%. The corresponding hit plot is shown in FIG. 10b. There was a total of 8,321 detections for the entire range-doppler-azimuth data set which is approximately 0.6% of the total range-doppler-azimuth data points for the first CIT. FIG. 10b, which is the hit plot that corresponds to FIG. 10a, shows that the adaptive detection system 10 successfully detected true targets such as the Hibernia rigs at a doppler frequency of 0 Hz and a range of approximately 320 to 350 km while minimizing the detection of false targets that are due to the spectral leakage of the Bragg lines.

Figure 11A:
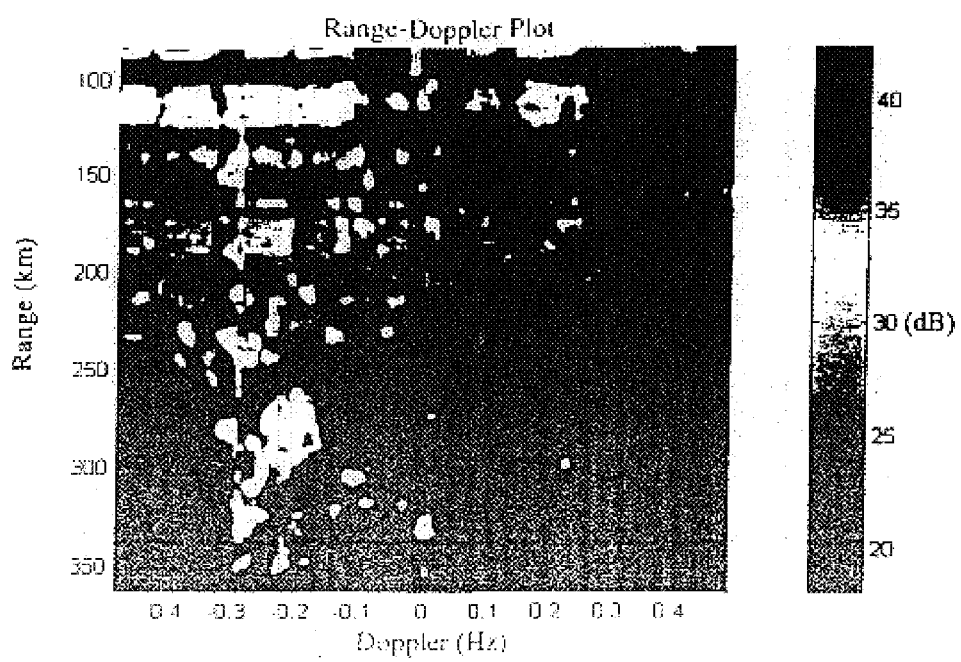
FIG. 11a is a second high resolution range-doppler plot of real HFSWR data recorded during the fall.
Figure 11B:
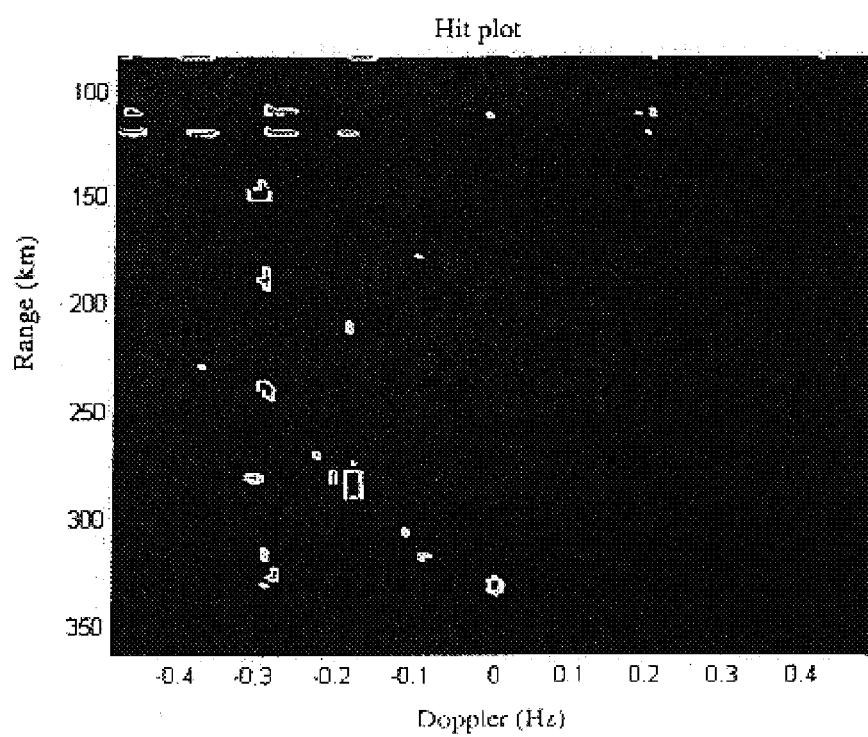

Reference is next made to FIGS. 11a and 11b which show experimental results for HFSWR data obtained during the fall season for a second CIT. In this case, the range-doppler plot in FIG. 11a is shown for an azimuth of −38° relative to the boresight of the receiving antenna array of the HFSWR system. The range-doppler-azimuth data for the second CIT had a σ of 2.9255 which, for a PD of 95%, resulted in a λ of 5.2659. The corresponding hit plot in FIG. 11b shows that the adaptive detection system 10 detected 8,171 targets for the range-doppler-azimuth data set processed for the second CIT which is less than 0.6% of the total range-data-azimuth data points. FIG. 11b also shows that the adaptive detection system 10 detected true targets such as the Hibernia rig at a range of approximately 328 km and a doppler frequency of 0 Hz while minimizing the detection of false targets that are due to the spectral leakage of ionospheric clutter.

Figure 12A:
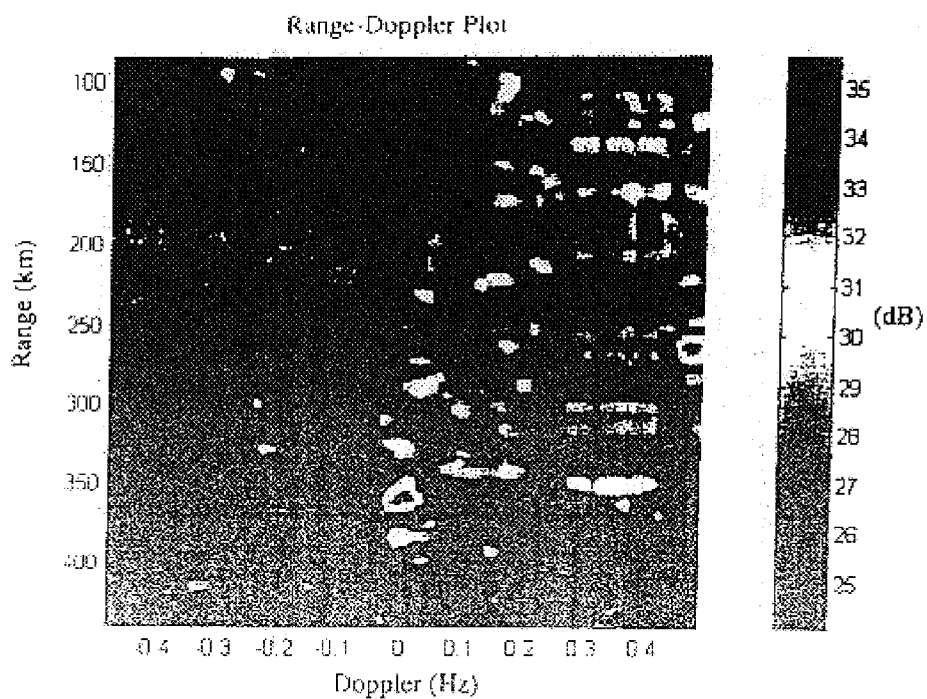
FIG. 12a is a high resolution range-doppler plot of real HFSWR data recorded during the winter.
Figure 12B:
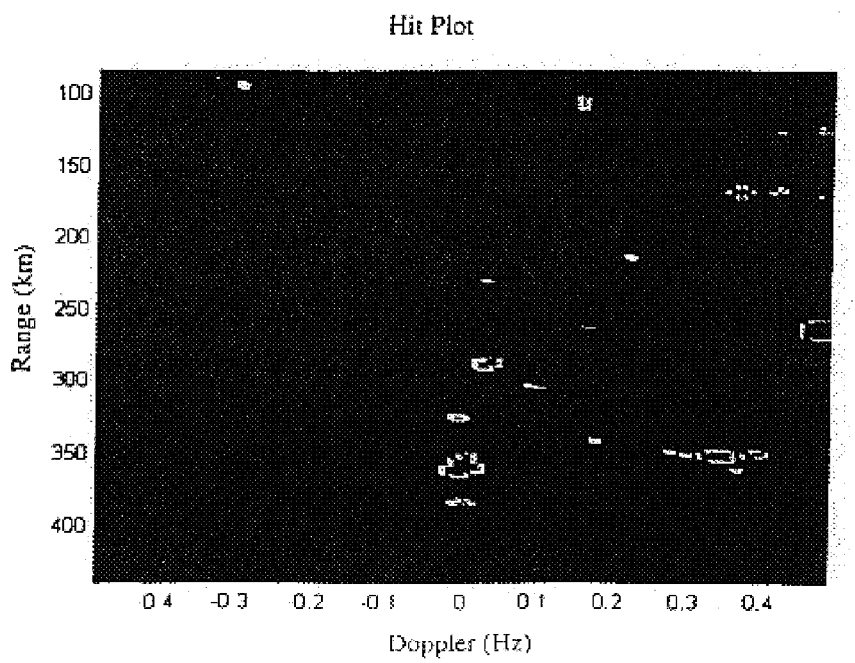

Referring next to FIG. 12a, shown therein is a high resolution range-doppler plot at an azimuth of −34° relative to the boresight of the receiving antenna array for the HFSWR system. The HFSWR data was recorded during the winter season in which the noise level due to atmospheric interference is higher compared to the fall season. Processing the HFSWR data for a third CIT resulted in 231,252 range-doppler-azimuth data points (239 range cells×88 doppler cells×11 azimuths). The range-doppler-azimuth data had a σ of 1.1788. This value of σ can be understood by referring to FIGS. 3a and 3b which show that for noisier data, the spread in amplitude between the noise level and the targets becomes smaller. As a result, the range-doppler-azimuth data for the third CIT has a smaller standard deviation than the range-doppler-azimuth data for the first and second CITs. Choosing a PD of 95% resulted in a λ of 2.1219. Thus, the threshold equation 3 has provided a lower threshold value for data with a higher noise level as was intended. The hit plot produced by the adaptive detection system 10 for the range-doppler data of FIG. 12a is shown in FIG. 12b. The number of targets detected for the third CIT was 2,304 which is about 1% of the total range-doppler-azimuth data points that were processed.

Figure 13A:
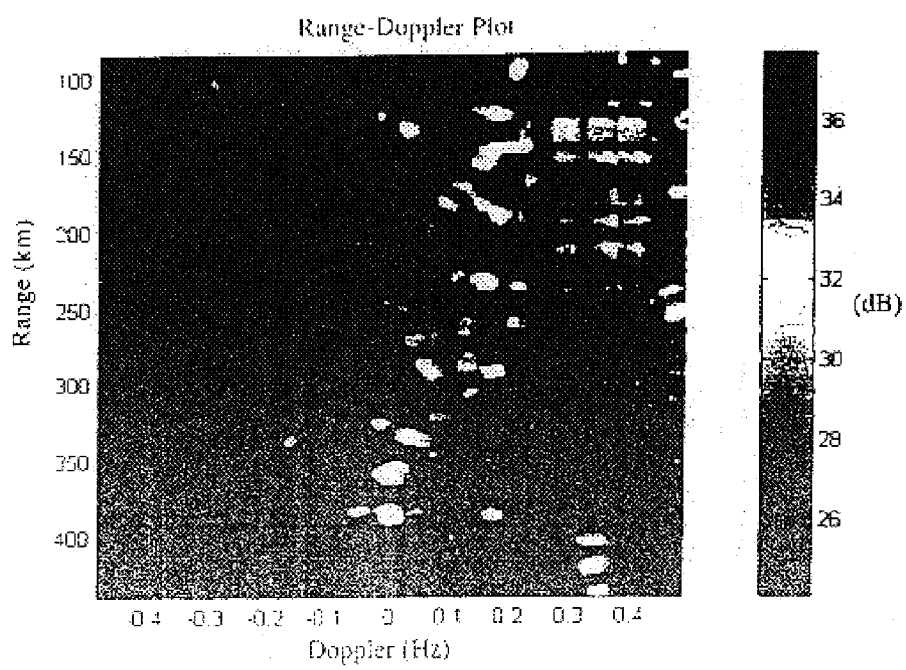
Figure 13B:
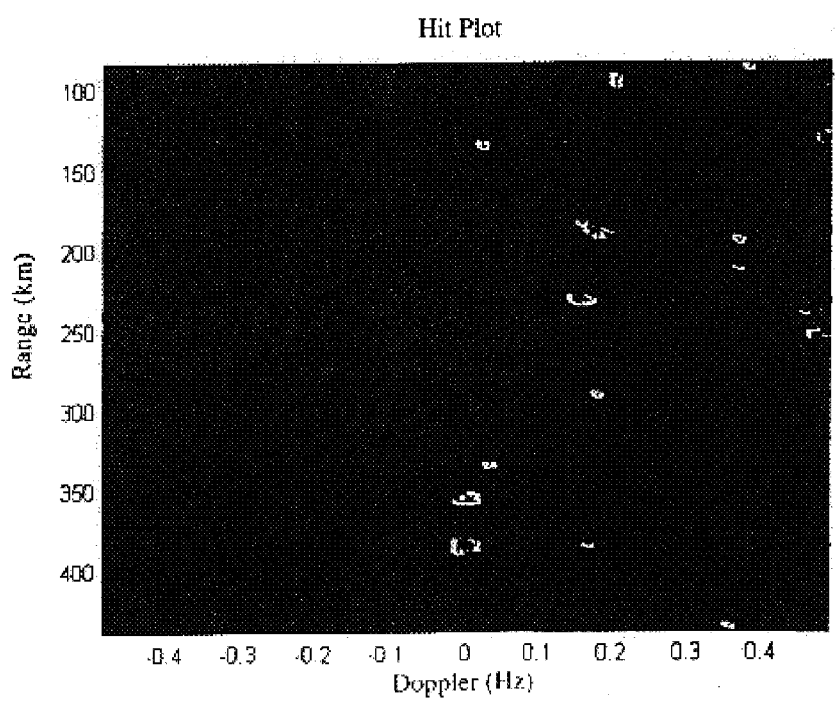

Referring next to FIGS. 13a and 13b, experimental results are shown for HFSWR data obtained during the winter season for a fourth CIT. In this case, the range-doppler plot in FIG. 13a is shown for an azimuth of −32° relative to the boresight of the receiving antenna array of the HFSWR system. The σ of the range-doppler-azimuth data plots for the fourth CIT was 1.4113 which, for a PD of 95%, resulted in a λ of 2.5404. The adaptive detection system 10 detected 2,109 targets for the fourth CIT which is less than 1% of the total range-data-azimuth data points. The corresponding hit plot in FIG. 13b shows that the adaptive detection system 10 detected small targets with small amplitudes (i.e. weak radar return signals) while minimizing the number of false targets coming from the spectral leakage of the Bragg lines and ionospheric clutter.

It should be understood that various modifications can be made to the preferred embodiments described and illustrated herein, without departing from the present invention, the scope of which is defined in the appended claims. For instance, the statistics may be generated by looking at range-doppler-sensor data instead of range-doppler-azimuth data. Range-doppler-sensor data is the concatenation across sensors of 2-D range-doppler data from each sensor in the receiving antenna array.

What is claimed is:

1. An adaptive detection system for analyzing range-doppler-azimuth data for target detection, said system comprising:
   a) a threshold calculator for calculating a threshold value based on the standard deviation of said range-doppler-azimuth data and a predetermined probability of detection; and,
   b) a detection module in communication with said threshold calculator for receiving said threshold value wherein, said detection module calculates an estimated target amplitude and an estimated noise floor amplitude from range-doppler data located in a detection window and detects a target when the difference between said estimated target amplitude and said estimated noise floor amplitude is larger than said threshold.

2. The system of claim 1, wherein said detection module comprises:
   i) a window generator for generating said detection window, said detection window having a target region, a guard region and a main region;
   ii) a signal calculator in communication with said window generator, for calculating said estimated target amplitude and said estimated noise floor amplitude; and
   iii) a decision module in communication with said signal calculator, for detecting said target.

3. The system of claim 2, wherein said detection module further comprises a storage module in communication with said decision module, for storing location and amplitude information for a detected target.

4. The system of claim 3, wherein said amplitude information is the average of range-doppler cell amplitudes in said target region.

5. The system of claim 2, wherein said guard region surrounds said target region and said main region surrounds said guard region, and said estimated target amplitude is a range-doppler cell amplitude at the center of said target region and said estimated noise floor amplitude is an average range-doppler cell amplitude in said main region.

6. The system of claim 2, wherein the size of said target region is varied based on detection mode.

7. The system of claim 2, wherein the size of said guard region is varied based on detection mode.

8. The system of claim 2, wherein the size of said main region is varied based on detection mode.

9. The system of claim 1, wherein said threshold calculator calculates said standard deviation (σ) of said range-doppler-azimuth data and calculates said threshold value (λ) according to the equation λ=X·σ where X is a value obtained from a percentile in a table of percentiles for a $\chi^{1.5}$ distribution and said percentile is equal to said predetermined probability of detection.

10. A detection module for analyzing range-doppler data for target detection, said detection module comprising:
   a) a window generator for generating a detection window having a target region, a guard region surrounding said target region and a main region surrounding said guard region;
   b) a signal calculator in communication with said window generator, for calculating an estimated target amplitude and an estimated noise floor amplitude, wherein said estimated target amplitude is a range-doppler cell amplitude at the center of said target region and said estimated noise floor amplitude is an average range-doppler cell amplitude in said main region;

c) a decision module in communication with said signal calculator, for detecting a target when the difference between said estimated target amplitude and said estimated noise floor amplitude is larger than a predetermined threshold value.

11. The detection module of claim 10, wherein said module further includes a storage module in communication with said decision module, for storing location and amplitude information for a detected target.

12. The detection unit of claim 11, wherein said amplitude information is the average of range-doppler cell amplitudes in said target region.

13. The detection unit of claim 10, wherein the size of said target region is varied based on detection mode.

14. The detection unit of claim 10, wherein the size of said guard region is varied based on detection mode.

15. The detection unit of claim 10, wherein the size of said main region is varied based on detection mode.

16. An adaptive detection method for analyzing range-doppler-azimuth data for target detection, said method comprising:

a) calculating a threshold value based on the standard deviation of said range-doppler-azimuth data and a predetermined probability of detection;

b) calculating an estimated target amplitude and an estimated noise floor amplitude based on range-doppler data contained in a detection window; and, c) detecting a target when the difference between said estimated target amplitude and said estimated noise floor amplitude is larger than said threshold value.

17. The method of claim 16, wherein step b) includes generating said detection window to provide range-doppler data for calculating said estimated target amplitude and said estimated noise floor amplitude.

18. The method of claim 17, wherein generating said detection window comprises:

a) generating a target region;

b) generating a guard region surrounding said target region; and, c) generating a main region surrounding said guard region.

19. The method of claim 18, wherein calculating said estimated target amplitude comprises obtaining the range-doppler cell amplitude at the center of said target region.

20. The method of claim 18, wherein calculating said estimated noise floor amplitude comprises calculating the average range-doppler cell amplitude in said main region.

21. The method of claim 18, wherein generating said target region comprises selecting a size based on detection mode.

22. The method of claim 18, wherein generating said guard region comprises selecting a size based on detection mode.

23. The method of claim 18, wherein generating said main region comprises selecting a size based on detection mode.

24. The method of claim 18, wherein storing said amplitude information comprises calculating the average of range-doppler cell amplitudes in said target region.

25. The method of claim 16, wherein said method further comprises:

d) storing location and amplitude information for a detected target.

26. The method of claim 16, wherein calculating said threshold value comprises:

a) calculating the standard deviation ($\sigma$) of said range-doppler-azimuth data;

b) selecting a value (X) from a percentile in a table of percentiles for a $\chi^{1.5}$ distribution wherein said percentile is equal to said predetermined probability of detection; and, c) calculating said threshold value ($\lambda$) according to the equation $\lambda = X \cdot \sigma$.

27. A detection method for analyzing range-doppler data for target detection, said method comprising:

a) generating a detection window having a target region, a guard region surrounding said target region and a main region surrounding said guard region;

b) calculating an estimated target amplitude and an estimated noise floor amplitude, wherein said estimated target amplitude is a range-doppler cell amplitude at the center of said target region and said estimated noise floor amplitude is an average range-doppler cell amplitude in said main region; and, c) detecting a target when the difference between said estimated target amplitude and said estimated noise floor amplitude is larger than a predetermined threshold value.

28. The method of claim 27, wherein said method further comprises:

d) storing location and amplitude information for a detected target.

29. The method of claim 28, wherein storing said amplitude information includes calculating the average of range-doppler cell amplitudes in said target region.

30. The method of claim 27, wherein the size of said target region is varied based on detection mode.

31. The method of claim 27, wherein the size of said guard region is varied based on detection mode.

32. The method of claim 27, wherein the size of said main region is varied based on detection mode.

* * * * *